United States Patent
Breitscheidel et al.

[11] Patent Number: 5,258,085
[45] Date of Patent: Nov. 2, 1993

[54] PROCESS FOR PRODUCING A LAYERED MATERIAL IN SHEET OR MEMBRANE FORM FROM THERMOPLASTIC FOAM

[75] Inventors: Hans-Ulrich Breitscheidel, Siegburg; Cosmas Lorry, Niederkassel, both of Fed. Rep. of Germany

[73] Assignee: Huls Troisdorf Aktiengesellschaft, Troisdorf, Fed. Rep. of Germany

[21] Appl. No.: 793,407
[22] PCT Filed: Jul. 11, 1990
[86] PCT No.: PCT/EP90/01130
§ 371 Date: Jan. 10, 1992
§ 102(e) Date: Jan. 10, 1992
[87] PCT Pub. No.: WO91/00800
PCT Pub. Date: Jan. 24, 1991

[30] Foreign Application Priority Data
Jul. 13, 1989 [DE] Fed. Rep. of Germany ....... 3923054

[51] Int. Cl.⁵ .................... B29C 65/02; B29C 65/18
[52] U.S. Cl. .................... 156/148; 156/252; 156/253; 156/296; 156/324; 156/583.5; 264/109; 264/113
[58] Field of Search .............. 156/62.2, 148, 296, 156/252, 253, 324, 583.5; 428/316.6; 264/109, 112, 113

[56] References Cited

U.S. PATENT DOCUMENTS

| | | | |
|---|---|---|---|
| 3,384,696 | 5/1968 | Makansi | 428/131 X |
| 3,451,109 | 6/1969 | Klein | 156/148 X |
| 3,746,610 | 7/1973 | Hoegger | |
| 3,867,240 | 2/1975 | Doerfling | 428/316.6 X |
| 3,966,526 | 6/1976 | Doerfling | 156/224 |
| 4,082,824 | 4/1978 | Del Carpio | |
| 4,417,932 | 11/1983 | Breitscheidel et al. | 156/322 X |
| 4,758,297 | 7/1988 | Calligarich | 156/148 X |
| 5,066,531 | 11/1991 | Legg et al. | 428/316.6 X |

FOREIGN PATENT DOCUMENTS

| | | |
|---|---|---|
| 0048836 | 9/1981 | European Pat. Off. |
| 96523 | 3/1971 | Fed. Rep. of Germany |
| 1704407 | 5/1971 | Fed. Rep. of Germany |
| 895069 | 1/1945 | France |
| 58-199116 | 11/1983 | Japan ................... 156/253 |

OTHER PUBLICATIONS

Patent Abstracts of Japan, vol. 7, No. 81 (M-205), Apr. 5, 1983 (JP 58-5335).

Primary Examiner—Jeff H. Aftergut
Attorney, Agent, or Firm—Millen, White, Zelano & Branigan

[57] ABSTRACT

A process for producing a layered material in sheet or membrane form from thermoplastic foam is described. The laminated material is suitable in particular for use as a drainage sheet or membrane. To produce the membrane, the thermoplastic foam in the form of strips, lengths, shreds or the like is piled up to form a layer of uniform height and compressed and compacted at a temperature below the softening temperature of the foam. Subsequently, the compressed and compacted layer of thermoplastic foam is perforated and fused with the aid of pins which are heated to a temperature of 400° to 800° C., whereupon the perforated and fused layer is cooled while maintaining the compression.

17 Claims, 1 Drawing Sheet

PROCESS FOR PRODUCING A LAYERED MATERIAL IN SHEET OR MEMBRANE FORM FROM THERMOPLASTIC FOAM

FIELD OF THE INVENTION

The invention relates to a process for producing a laminated material in sheet or membrane form from thermoplastic foam, in particular for use as a drainage sheet or membrane.

Prior Art

A process of the generic type is known from DE-C2-30 37 011 (US-A-4,417,932). According to this process, membranes or sheets are produced from remnant shreds of polyethylene foam of high apparent density by means of radiant heat and subsequent pressure treatment. A disadvantage of the known process is the high expenditure on apparatus. Furthermore, this process is suitable only for the processing of foam shreds of uniform apparent density. High fault susceptibility is to be observed in particular in the case of low apparent densities (less than 80 kg/m$^3$).

Similar processes are also known from British Patent 1,578,045 and US-A-3,746,610.

Object

The object of the present invention is, therefore, to provide a process for producing a layered material in sheet or membrane form from thermoplastic foam, in particular for use as a drainage sheet or membrane, which makes it possible to process foam material of various apparent densities with low expenditure on apparatus.

SUMMARY OF THE INVENTION

This object is achieved according to the invention by
the thermoplastic foam in the form of strips, lengths, shreds or the like being piled up to form a layer of uniform height and
being compressed and compacted at a temperature below the softening temperature of the foam,
by the compressed and compacted layer of thermoplastic foam being perforated and fused with the aid of pins, which are heated to a temperature of more than 250° C., preferably up to 800° C. (e.g., 400° to 800° C.), and which have an outside diameter of 2 to 15 mm, at an average spacing of 10 to 50 mm and with a dwell time of the pins of 1 to 10 s
and by the perforated and fused layer subsequently being cooled while maintaining the compression.

An essential feature of the invention is that the compacted foam strips, lengths or shreds are fused to one another within a short time by means of heated metal pins or the like. The high maximum temperature of the pins, preferably 600° to 700° C., has the effect that the foam material is in contact with the metal pins only for a short time and is subsequently further heated indirectly, i.e., by thermal conduction or thermal radiation. Accordingly, the finished membrane or sheet subsequently has perforations composed of channels, the individual channels having a diameter which is approximately 2 to 4 mm greater than the diameter of the pins used.

The process according to the invention can be performed both discontinuously and (quasi) continuously. In the case of a discontinuous procedure, for example, foam shreds of chemically or physically crosslinked polyethylene foam, in particular remnant or recycling material, are poured into a mould, the filling height preferably being 20 to 200 mm, especially 30 to 150 mm. If a foam material of high relative density is used, a low filling height is preferred and, if foam material of lower relative density is used, a higher filling height is preferred. The mould is subsequently closed by means of a perforated cover and the foam is compressed. Subsequently, externally heated or internally heatable metal pins are pushed through the holes of the cover and, after a dwell time of 1 to 10 s, preferably 2 to 4 s, are withdrawn again. The heated or heatable metal pins may in this case be arranged in one or more rows, if appropriate all the holes or channels may also be produced simultaneously by a correspondingly high number of metal pins. The diameters of the holes of the cover are expediently adapted to the outside diameter of the heated or heatable metal pins.

The process according to the invention can be carried out (quasi) continuously in a particularly cost-effective way by shreds or the like of thermoplastic foam, preferably of chemically or physically crosslinked polyethylene foam, being compacted between two compression-resistant chain belts (double-belt press) and fed to a fusing station. The compression-resistant chain belts are, in this case, expediently perforated and move in steps. During the standstill phase, the fusing is performed by pushing externally heated or internally heated metal pins through the perforations of the belts in rows or groups. In a following cooling zone, the compression is maintained by the belts. For smoothing the surface, a thin membrane of foam or plastic may be drawn in at the same time. If appropriate, after leaving the chain belts, the surface of the membrane of shreds may be heated by means of hot air and smoothed by cold rolls. Finally, edge trimming can be carried out, and this is expediently performed in line.

A major advantage of the process according to the invention is that recycling foam material containing fibrous material can also be used. Furthermore, foam material of various densities can be used, including in mixtures.

BRIEF DESCRIPTION OF THE DRAWING

The process according to the invention is described in further detail below with reference to the drawing, in which.

DETAILED DESCRIPTION

EXAMPLE 1

Figure 1:
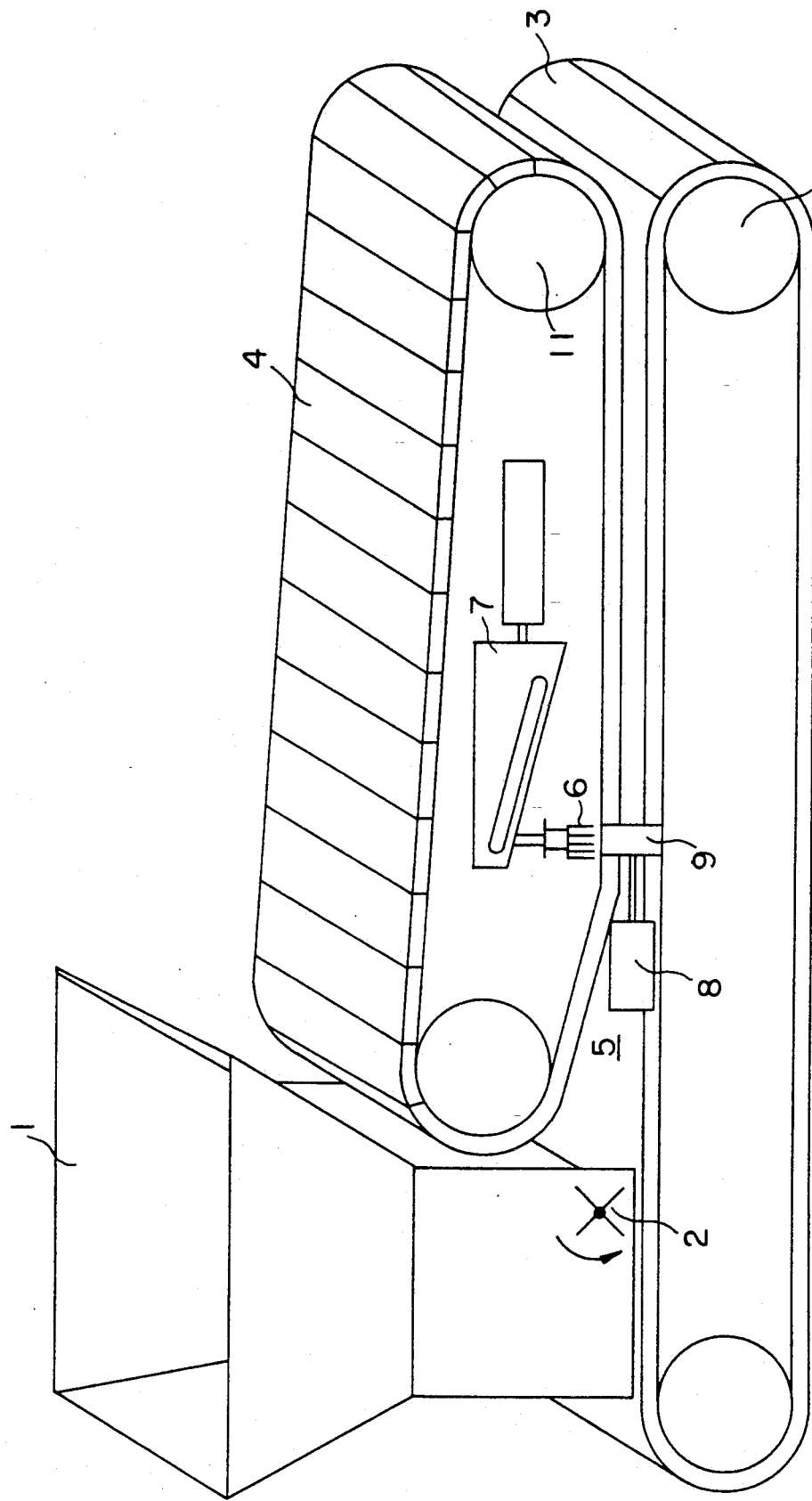
FIG. 1 shows a basic diagram of an installation for the continuous production of a drainage membrane.

For the (quasi) continuous production of a drainage membrane of a thickness of 20 mm, foam shreds of an average dimension of 25 mm and an average apparent density of 80 kg/m$^3$ are introduced by means of conveying devices (not shown) into the metering hopper 1. The metering roll 2 controls the conveying rate of the foam shreds by means of a control device (not shown).

The foam shreds are subsequently conveyed by the lower chain belt 3 at room temperature into the wedge-shaped gap 5 between the lower chain belt 3 and the upper chain belt 4 and elastically compressed between the chain belts 3, 4 to a thickness of 18 mm.

In the illustrative embodiment shown, the useful width of the chain belts is 500 mm. The individual plate-shaped chain links have a width of 100 mm each; correspondingly, the stepped advancement of the chain belts is likewise 100 mm. Each plate-shaped chain link has in each of 5 rows 25 holes of a diameter of 8 mm and a mutual center-to-center spacing of 20 mm (not shown in the figure).

The stepped advancement of the chain belts 3, 4 is performed synchronously by the advancing device 8, an exactly coordinated placement of the holes of the two chain belts 3, 4 being brought about by the synchronizing means 9, for example, in the form of precisely aligned cams on the chain belts.

In every standstill phase of the chain belts 3, 4, a lifting means 7, provided with 5×25 heating pins 6, is actuated, the individual heating pins, of a diameter of 4 mm and an initial surface temperature of 650° C., being pushed through the upper chain belt 4, the layer of foam shreds, compacted in the cold state, as well as through the lower chain belt 3. The dwell time of the pins in the layer of foam shreds is 3 s. In this time, the foam shreds are partially melted and fused to one another by thermal conduction and radiation. After each "fusing operation", the metal pins 6 are withdrawn from the two chain belts and the layer of foam shreds lying inbetween, so that the next stepped advancement of the chain belts by 100 mm can be performed.

The pressure of the chain belts 3, 4 at a level of about 1.5 bar is maintained substantially constantly up to the chain deflection points 10, 11. As a result, the layer of foam shreds can cool and the mechanical compaction can be fixed. In addition, the bonds produced by means of heat receive their mechanical strength by cooling before leaving the compression zone. For edge limitation, usual limitation elements (not shown) may run along between the chain belts.

After leaving the cooling zone, the finished membrane of a thickness of 20 mm and an average relative density of 140 kg/m³ is made up into roll or sheet stock in a known way by longitudinal and transverse cutting apparatuses.

EXAMPLE 2 to 4

The same procedure as in Example 1 is followed, only the composition of the foam shreds having been varied, as follows:

| Example | Average piece size of the shreds (mm) | Apparent density of the shreds (kg/m³) | Apparent density of the drainage membrane (kg/m³) |
|---|---|---|---|
| 2 | 30 × 30 × 10 | 30 | 120 |
| 3 | 30 × 30 × 7 | 140 | 187 |
| 4 | 30 × 30 × 4* | 125 (75%) | 196 |
|   | 30 × 30 × 10 | 30 (25%) |   |

*With nonwoven lamination

The finished membranes or sheets of adequate strength and flexibility have perforations right through for drainage purposes corresponding to the heating pin arrangement.

| Key |
|---|
| 1 Metering hopper |
| 2 Metering roll |
| 3 Lower chain belt |
| 4 Upper chain belt |
| 5 Gap |
| 6 Pins |
| 7 Lifting means |
| 8 Advancing device |
| 9 Synchronizing means |
| 10 Chain deflection point |
| 11 Chain deflection point |

We claim:
1. A method for making a thermoplastic foam product comprising:
piling a plurality of individual pieces of thermoplastic foam material having an average size of 15–30 mm to form a layer;
compressing and compacting said layer of thermoplastic foam pieces;
fusing together individual thermoplastic foam pieces of the resultant compressed layer by perforating said layer using pins heated to a temperature of more than 250° C.; and
cooling the resultant perforated, fused layer.

2. A process for producing a layered material in sheet form from pieces of thermoplastic foam having a softening temperature, comprising:
piling a plurality of individual pieces of thermoplastic foam having an average size of 15–30 mm to form a piled-up layer of uniform height;
compressing and compacting said layer of individual foam pieces at a temperature below said softening temperature of said foam to form a compressed and compacted layer;
perforating said compressed and compacted layer of thermoplastic foam whereby individual foam pieces are fused together using pins heated to a temperature of more than 250° C., said pins having an outside diameter of 2 to 15 mm and an average spacing of 10 to 50 mm, and with a dwell time of said pins within said compressed and compacting layer of 1 to 10 seconds; and
cooling the resultant perforated and fused layer while maintaining compression.

3. A process according to claim 2, wherein said pieces of thermoplastic foam have an average apparent density of 30–150 kg/m³, and said piled-up layer formed by the piling of said pieces has a height of 20–200 mm.

4. A process according to claim 3, wherein said piled-up layer formed by the piling of said pieces has a height of 30–150 mm.

5. A process according to claim 1, wherein compression of the piled-up foam layer is performed continuously by means of a double-belt press, wherein each of the belts are provided with perforations for guiding said pins.

6. A process according to claim 5, wherein said pieces of thermoplastic foam are piled on said double-belt press via a metering hopper.

7. A process according to claim 2, wherein said pins have an outside diameter of 3.5–4.5 mm, a surface temperature of 600°–700° C., and an average spacing of 15–25 mm.

8. A process according to claim 2, wherein said pieces of thermoplastic foam are continuously piled to form said piled-up layer of uniform height.

9. A process according to claim 2, further comprising providing a plastic membrane for smoothing the surface of the perforated and fused layer.

10. A process according to claim 2, wherein said pins are heated to a temperature of up to 800° C..

11. A process according to claim 2, wherein the dwell time of said pins is 2-4 seconds.

12. A process according to claim 2, wherein said pieces of thermoplastic foam are pieces of crosslinked polyethylene foam.

13. A process according to claim 2, wherein said pins are externally heated.

14. A process according to claim 2, wherein said pins are internally heated.

15. A process according to claim 2, wherein the average apparent density of the pieces of thermoplastic foam is 30-140 kg/m³ and the apparent average density of the resultant layered material in sheet form is 120-196 kg/m³.

16. A process according to claim 2, wherein said pins are heated to a temperature of 400°-800° C.

17. A process for producing a layered material in sheet form from pieces of thermoplastic foam having a softening temperature, comprising:

piling a plurality of individual pieces of thermoplastic foam to form a piled-up layer of uniform height;

compressing and compacting said layer of individual foam pieces at a temperature below said softening temperature of said foam to form a compressed and compacted layer;

perforating said compressed and compacted layer of thermoplastic foam whereby individual foam pieces are fused together using pins heated to a temperature of more than 250° C., said pins having an outside diameter of 2 to 15 mm and an average spacing of 10 to 50 mm, and with a dwell time of said pins within said compressed and compacted layer of 1 to 10 seconds; and cooling the resultant perforated and fused layer while maintaining compression;

wherein compression of the piled-up foam layer is performed continuously by means of a double-belt press, in which each belt is provided with perforations for guiding said pins.

* * * * *